United States Patent

McElroy

[11] 4,115,705
[45] Sep. 19, 1978

[54] ELECTRONIC CALCULATOR WITH PUSH-BUTTON ON-OFF SYSTEM

[75] Inventor: David J. McElroy, Houston, Tex.

[73] Assignee: Texas Instruments Incorporated, Dallas, Tex.

[21] Appl. No.: 695,886

[22] Filed: Jun. 14, 1976

[51] Int. Cl.² .............................................. H03K 17/60
[52] U.S. Cl. ....................... 307/140; 307/115
[58] Field of Search ............. 307/140, 139, 115, 113, 307/112, 247 A; 200/5 A

[56] References Cited

U.S. PATENT DOCUMENTS

| | | | |
|---|---|---|---|
| 3,743,860 | 7/1973 | Rossell | 307/247 A |
| 3,831,081 | 8/1974 | Weiss | 307/247 A |
| 3,911,426 | 10/1975 | Mouton | 340/336 |
| 3,918,041 | 11/1975 | Mao | 340/336 |
| 3,996,430 | 12/1976 | Eberwein | 200/5 A |
| 4,005,293 | 1/1977 | Boulanger | 200/5 A |

OTHER PUBLICATIONS

Marston, "40 Projects Using COSMOS Digital IC's" from Radio-Electronics, Oct. 1974, especially FIG. 12.

Primary Examiner—Robert K. Schaefer
Assistant Examiner—William L. Feeney
Attorney, Agent, or Firm—James T. Comfort; John G. Graham

[57] ABSTRACT

An electronic calculator with a power supply ON-OFF arrangement actuated by momentary-closure push-button switches which are part of the keyboard. A bistable latch circuit on the calculator chip is continuously powered by the battery, and is caused to flip to an ON condition by actuating an ON key, and this turns on a large, low-resistance transistor which is in series with the voltage supply line going to all of the other electronic circuitry on the chip.

3 Claims, 10 Drawing Figures

ELECTRONIC CALCULATOR WITH PUSH-BUTTON ON-OFF SYSTEM

BACKGROUND OF THE INVENTION

The invention relates to a calculator or other small battery operated, keyboard actuated electronic device, and particularly to a technique for providing a push-button keyboard ON-OFF switch for such devices.

Electronic calculator systems of the type having all of the main electronic functions within a single large scale integrated (LSI) semiconductor chip, or a small number of chips, are described in the following prior applications or patents assigned to Texas Instruments Incorporated: U.S. Pat. No. 3,819,921, by Kilby, Merryman and Van Tassel, for "Miniature Electronic Calculator", based on an application originally filed Sept. 29, 1967; U.S. Pat. No. 4,074,351 issued Feb. 14, 1978, by Boone and Cochran, for "Variable Function Programmed Calculator"; U.S. Pat. No. 3,892,957, issued July 1, 1975 to John D. Bryant; U.S. Pat. No. 3,987,416, issued Oct. 19, 1976, filed Sept. 24, 1973, by Vandierendonck, Fisher and Hartsell for "Electronic Calculator With Display And Keyboard Scanning"; U.S. Pat. No. 3,900,722, issued Aug. 19, 1975 to Michael J. Cochran and Charles P. Grant, for "Multi-Chip Calculator System"; U.S. Pat. No. 3,991,305, issued Nov. 9, 1976, filed Nov. 19, 1974, by Raymond and Caudel, for "Electronic Calculator or Digital Processor Chip With Multiple Code Combinations of Display And Keyboard Scan Outputs"; and others.

These prior inventions have made possible vast reductions in cost and size, and increases in functions, in electronic calculators. Many millions of such calculators have been produced. The efforts to reduce manufacturing costs, while at the same time to increase the functions available to the user, are continuing. These efforts have resulted in the price of a basic four function electronic calculator dropping from over $200 to less than $10 in less than three years.

Although the MOS/LSI calculator system as referred to above incorporated in one or two chips all of the computational circuits of the calculator, including data registers, arithmetic unit, a ROM for containing the program, and all of the control circuits, input/output decoders, and the like, it was necessary to have certain devices in addition to the MOS/LSI chip on the printed circuit board to provide a completed calculator. That is, in early versions the MOS/LSI package, along with a display and a keyboard, did not alone provide a calculator. Initially, hand-held, battery operated "one-chip" calculators required, in addition to the MOS/LSI chip, several external circuits for power supply, clock generators, and digit and segment drivers. Subsequent developments made it possible to eliminate the external clock generator circuits by placing these on the chip itself. Also, by using improved MOS processes, it became possible to eliminate or minimize the external power supply circuitry; if the MOS logic could be operated at low voltage, then the chip could be driven directly from a single 9V. battery, for example. The digit and segment drivers were eliminated by improved processes and by the segment scanning technique of copending applications U.S. Pat. Nos. 4,014,013 and 4,014,012, issued Mar. 22, 1977, filed Apr. 7, 1975 and assigned to Texax Instruments. Thus the calculator was reduced to a very few parts, e.g., an MOS/LSI chip, a display device, a keyboard, a printed circuit board, a battery, and a case or housing, in addition to a slide-type ON-OFF switch. The parts and assembly costs for such a calculator, retailing for under $10, would be probably less than $5; in such a situation, the ON-OFF switch becomes a significant cost factor, which was not true when the cost was much higher.

Push-button or keyboard ON-OFF arrangements have been previously provided on calculators, particularly a calculator sold by Litronix of Cupertino, Calif. in 1975. However, this device required a number of components external to the MOS/LSI chip to operate, and so the cost saving was minimal, if indeed the cost was not greater.

It is the primary object of this invention to provide a calculator system or the like wherein a momentary push-button or "keyboard" ON-OFF function is provided, with few or no components external to an MOS/LSI chip being needed, other than a display, a keyboard and a battery. Another object is to provide improved ON-OFF circuitry for an electronic calculator or the like.

An additional object is to provide an electronic calculator or other battery generated deviceof minimum cost and complexity and maximum battery life.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF SPECIFIC EMBODIMENT

Figure 1:
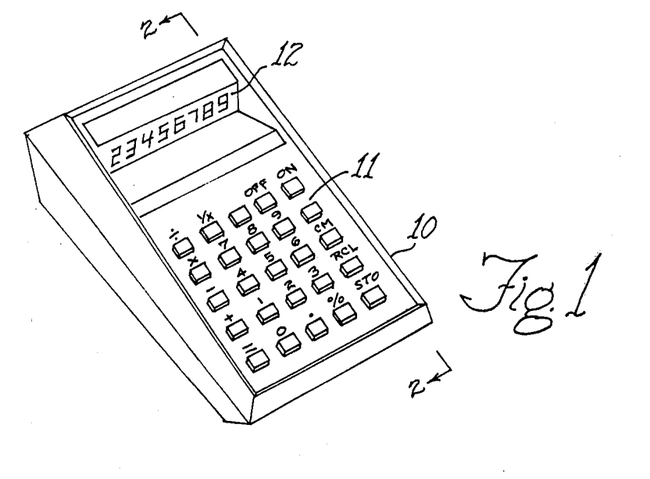
FIG. 1 is a pictorial view of a small hand-held calculator in which the ON-OFF switch system of the invention may be utilized.

Referring to FIG. 1, a typical small electronic calculator in which the invention finds utility is shown, comprising a case or housing 10 of molded plastic or the like, with a keyboard 11 and a display 12. The keyboard includes number keys 0-9, a decimal point key, and several standard operation keys such as $+$, $-$, $=$, $\times$, $\div$, etc. In some embodiments, the calculator system could perform a variety of additional functions, so keys such as $\sqrt{x}$, $\sqrt[x]{y}$, $Y^x$, SIN, COS, TAN, LOG, %, LN, STO, RCL, etc., may be included in the keyboard 11. The display 12 has a number of digits of the seven segment type, with decimal points. Displays of eight, 10 or 12 digits are standard and these may also include exponents for scientific notation, and minus sign for both mantissa and exponent. The display usually comprises visible light emitting diodes (LED's), although vacuum fluorescent displays, a gas discharge panel, or liquid crystal devices, for example, may also be used with appropriate interface circuitry. The calculator is a self-contained unit having a power supply in the form of a battery or batteries within the housing 10, although an AC adapter may be attached, as well as a battery charger if rechargeable nickel cadmium batteries are used.

In place of the usual ON-OFF slide switch which has been used in prior calculators, the calculator of FIG. 1 includes a push-button, momentary contact on switch 14 and a like push-button OFF switch 15. The switches 14 and 15 are exactly like the remainder of the keyswitches in the keyboard 11 in that they are single-pole single-throw normally open "Form A" switches which remain closed only as long as pressure is manually applied. In contrast, the usual slide switch would remain closed when moved to the ON position, supplying voltage from the battery to the electronic circuitry of the calculator continuously until the switch is manually moved to the OFF position.

Figure 2:
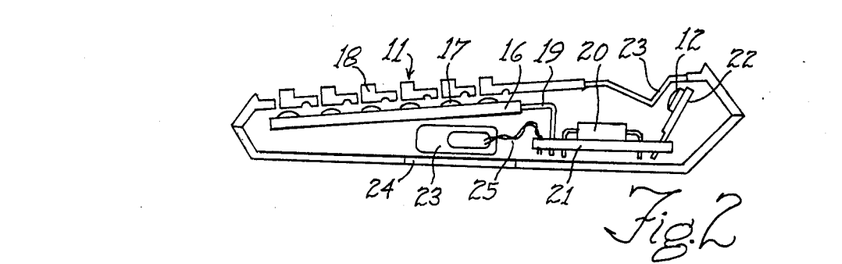
FIG. 2 is an elevation view in section of the calculator of FIG. 1, taken along the line 2—2 of FIG. 1.

In FIG. 2, the general form of the internal structure of the calculator is seen. The keyboard 11 includes an X-Y matrix keyboard device 16 of the type shown in U.S. Pat. No. 4,005,293, issued Jan. 25, 1977, assigned to Texas Instruments. The keyboard device 16 has flexible metal snap-acting discs 17 for each keyswitch, and these are pushed down by keys 18 which are an integral part of the top of the plastic housing 10. About ten to thirteen rigid wires 19 extend from the end of the keyboard device 16 for connection to the electronic circuitry of the calculator. A calculator chip 20 contains all of the memory, arithmetic and control circuitry, as will be described. The chip 20 is encased in a standard twenty-eight pin dual-in-line plastic package for example, which is commonly used in the semiconductor industry. Depending upon the complexity of the calculator, and the multiplexing scheme used, the number of pins in the package could be more or less, and also other chip packaging and mounting techniques may be used. The chip 20 is connected to a printed or etched circuit board 21 by soldering the pins to conductors on the board, as are the wires 19. The VLED display 12 is mounted on a small PC board 22, beneath a red plastic lens 23 which enhances the visibility of the display. The PC board 22 is mounted on the board 21 by pins soldered to conductors on the board which make the desired connections from the chip 20 to the display. A 9V. battery 23 is mounted in a compartment behind a door 24 in the housing 10, and is connected to the PC board 21 by wires 25 which are soldered to the PC board at one end and engage terminals of the battery by snap-on connectors at the other end.

The simplicity of the calculator is apparent from FIG. 2. It consists of a housing, a keyboard device, a chip, a display device, two small PC boards, and a battery. No components are needed on the board 21 except the chip 20, i.e., no resistors, capacitors, transistors, drivers, or any other devices. Thus, the relative cost savings of eliminating a power switch can be appreciated. The savings will be not only in materials but in assembly time, as well as reliability.

Figure 3:
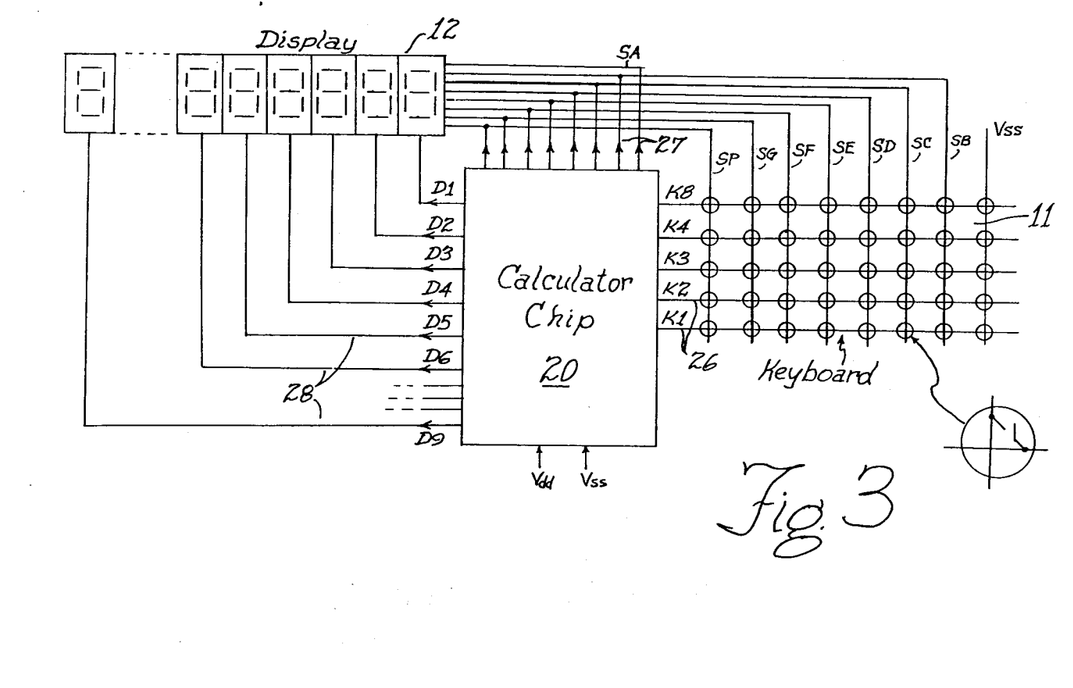
FIG. 3 is a block diagram of a display and keyboard scanning system used in the calculator of FIGS. 1 and 2.
Figure 4:
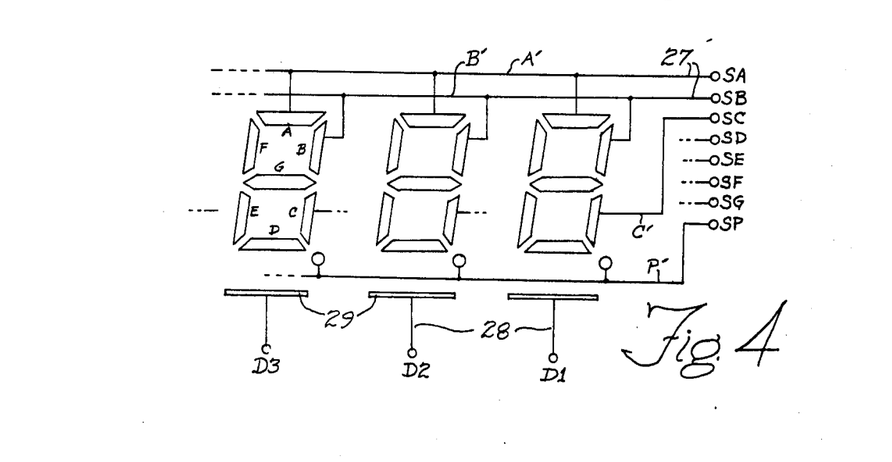
FIG. 4 is an electrical diagram of the display used in the calculator of FIGS. 1-3.

The general organization of a calculator system as in FIG. 1 is seen in block diagram in FIG. 3, where the keyboard 11 and display 12 are interconnected with the semiconductor chip 20 employing display multiplexing and keyboard scanning of the segment scan type set forth in U.S. Pat. No. 4,014,013, issued Mar. 22, 1977, filed Apr. 7, 1975. Inputs to the chip are by five "K lines" 26 which are five of the wires 19. Outputs from the chip include eight segment outputs SA to SP on lines 27 which are connected to common segments of the display 12. Typically, the segments are anodes of LED's. All like segments in each of the digits of the display are connected together as seen in FIG. 4, so only eight segment outputs are needed. The digits or cathodes of the display 12 are driven by output lines 28 which are labelled D1 to D6, etc., it being understood that there would be a number of output lines 28 corresponding to the number of digits or characters of the display 12. Seven of the segment lines 27 or SB to SP are also connected to the matrix of key switches which make up the keyboard 11, and the remaining line is connected to Vss. With eight segment output lines 27, the matrix contains eight times five or forty crosspoints so there are 40 possible key positions, not all of which need be used. A minimum function calculator with only a [×], [÷], [+], [−], [=], [C], [.], [0-9], [ON] and [OFF] keyboards needs only 19 keys, while a complex scientific calculator with trig and log functions, exponentials, memory and the like may use all 40 keys. Other input/output pins for the chip 20 include a voltage supply or Vdd pin 41, and a ground or Vss pin.

Referring to FIG. 4, the display 12 is shown in more detail. Only three digits are shown, each digit being made up of seven segments A to G plus a decimal point P. The outputs 27 from the chip are labeled SA to SP corresponding to the segments in the display. All of the A segments are connected together by a line A', all B's are connected together by a line B', and C's by a line C', etc., and all decimal points P are connected together by a line P'. The segments A to P represent separate anodes sharing a common cathode in a LED unit. The digit outputs 28 are separately connected to cathodes 29. Cathodes are common to all anode segments in a digit for LED displays.

Figure 5:
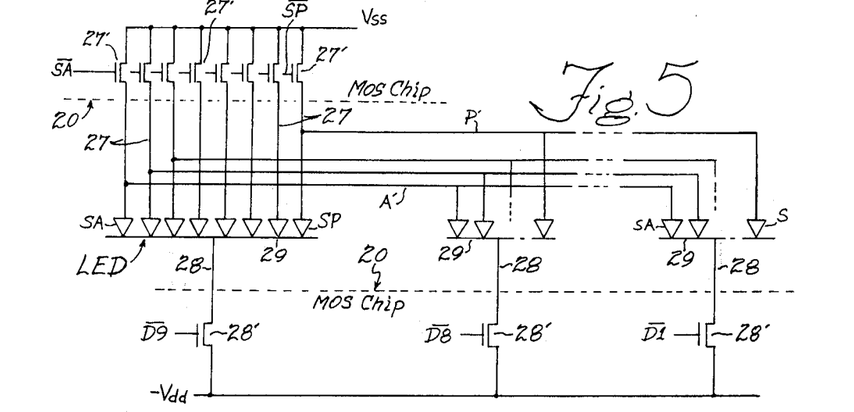
FIG. 5 is a schematic diagram of the display circuit of FIG. 4.

The display arrangement of FIG. 4 is illustrated in electrical schematic diagram form in FIG. 5. Each digit of the display 12 is comprised of an LED with a common cathode 29 and eight separate segments A to P. The cathodes 29 are each connected via a line 28 to the MOS chip 20, and the segment anodes are connected by lines 27 to the MOS chip.

Figure 6:
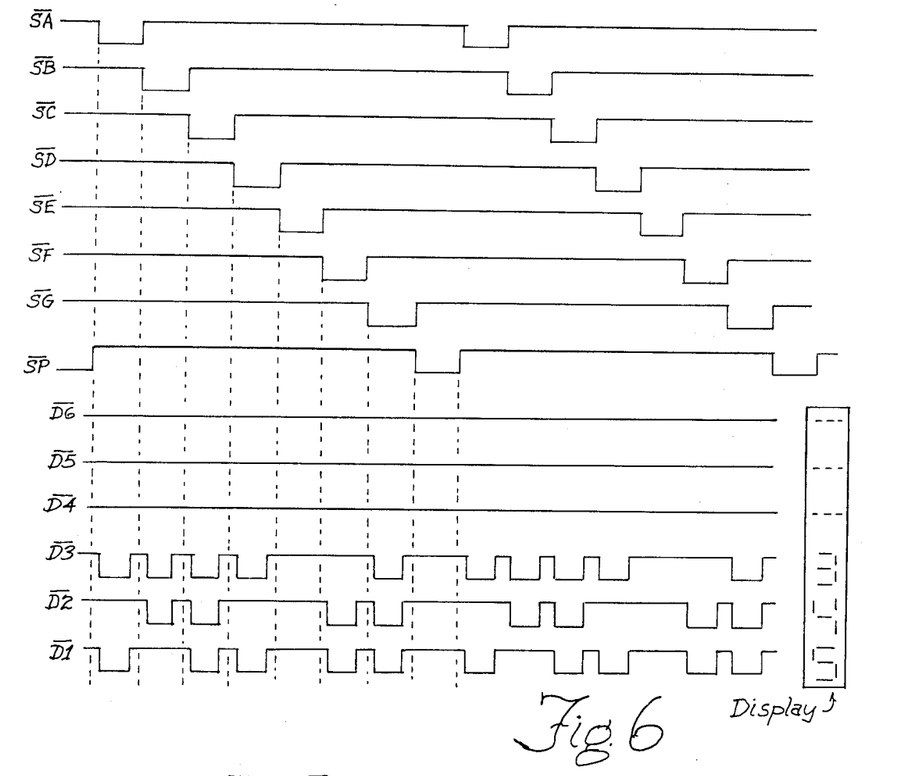
FIG. 6 is a timing diagram in the form of a graph of voltage vs time in the systm of FIG. 3.

As seen in FIGS. 5 and 6 the segment outputs 27 are scanned or strobed in a regular repeating sequence of signals $\overline{SA}$ to $\overline{SP}$ which drive output transistors 30 on the MOS chip 20. The digits or cathodes of the LED's of the display 12 are selectively energized by output lines 28 labeled D1, D2, etc., by output transistors 31 on the MOS chip 20, in a coded manner synchronized with the segment scan signals $\overline{SA}$ to $\overline{SP}$ so that the desired digits will be visable, such as illustrated in the example of FIG. 6. To show the decimal number 000345, or - - - 345 with leading zeros suppressed, only $\overline{D1}$, $\overline{D2}$ and $\overline{D3}$ signals will appear, and only in the code shown. For example, when segment SA is actuated, D3 and D1 will be actuated because the A segment appears in the "3" and "5" of digit positions three and one, respectively, but not in the "4" of digit position two.

Figure 7:
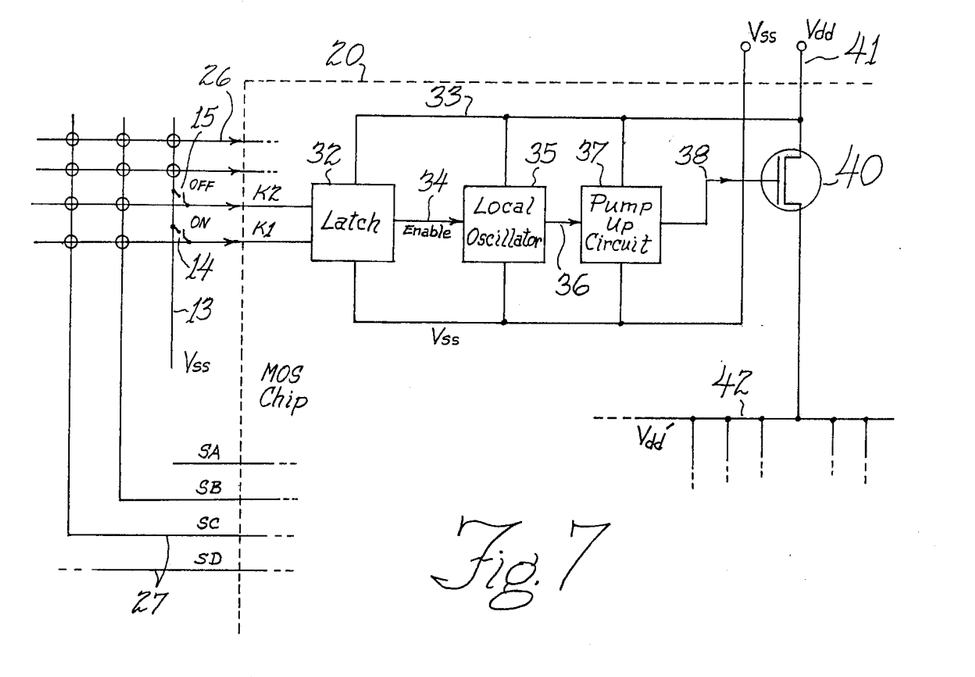
FIG. 7 is a block diagram of the ON-OFF switch system of the invention, used in the calculator chip 20 of FIG. 3.

Referring now to FIG. 7, a block diagram of the ON-OFF switch system of the invention is illustrated. The ON switch 14 is located at the intersection of the grounded line 13 and the K1 line, while the OFF switch 15 is located at the intersection of the line 13 and the K2 line. The K1 and K2 lines are applied to a latch circuit 32 which is continuously powered by a line 33 connected permanently to the battery by the Vdd pin of the chip 20. The latch 32 functions to flip one state when input line K1 is grounded by closing the ON switch 14, and to flip to the other stable state when the input line K2 is grounded by closing OFF switch 15. The latch 32 must draw a minimum holding current so that the battery will not be unduly drained after a long period in the OFF condition; this circuit is designed to draw about 30 microamps, which is adequate to provide a battery life of many months, perhaps 2 years, in the off condition. The latch 32 produces an output on a line 34 when flipped to the ON condition, and this output acts as an enable signal input to an oscillator 35. The oscillator operates at about 50KHZ only when the enable signal is present, otherwise it does not oscillate and drains almost no current even though it is also connected to Vdd line 33 at all times. The oscillator output is applied via line 36 to a pump-up circuit 37 which functions to generate a voltage output on line 38 at a level substantially greater than Vdd. This voltage on line 38 will of course exist only when the latch 32 is in the state produced by pushing the ON key 14. The pump-up circuit 37 is also permanently powered by connection to Vdd line 33, but draws no current except when the oscillator is producing an output on line 36, i.e., when in the ON condition. The high level voltage on the line 38 drives a large, wide-channel MOS transistor 40 which connects the Vdd pin 41 to all of the remainder of the circuitry on the chip via a Vdd' line 42.

Figure 8:
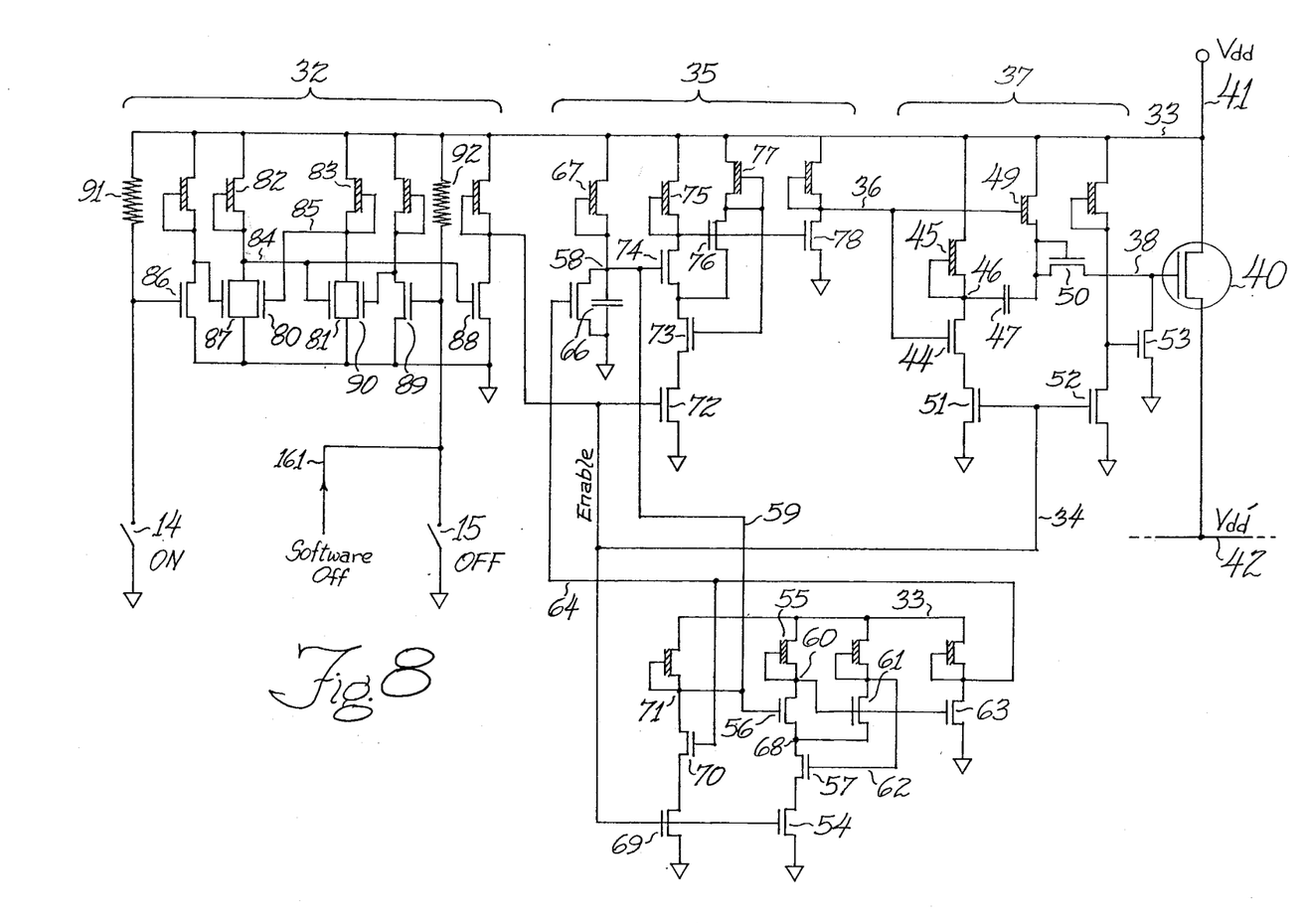
FIG. 8 is a detailed schematic diagram of the electrical circuit of FIG. 7.

In FIG. 8, the pump-up circuit 37 comprises an inverter circuit including a driver transistor 44 and a depletion load 45 which produces a 50 KHZ square wave on a node 46 that is the inverse of the square wave on line 36 at the oscillator output. Of course, the square waves on line 36 and node 46 exist only when the latch 32 is in the ON condition. A capacitor 47 couples the node 46 to a node 48. A depletion load device 49 driven by the line 36 functions to apply Vdd to the node 48 during the half cycles of the square wave when the line 36 is negative. During the half cycles when the line 36 is at Vss, the node 46 is negative, and these negative pulses are coupled to the node 48 via capacitor 47 so the capacitance of node 48 charges more negative than −Vdd. A transistor 50 connected as a diode will conduct during the half cycles when node 48 is more negative than −Vdd. Thus the capacitance of line 38 and the gate of transistor 40 will charge to a level much more negative than −Vdd, so that the transistor 40 will have little or no drop across it when conductive.

The enable signal on line 34 is applied to the gate of a transistor 51 in series with the inverter transistor 44, so this inverter will not conduct current in the off condition of the latch 32. Also, the enable signal is connected to the gate of an inverter 52 which drives a device 53 which functions to ground the gate of transistor 40 when the enable signal is at Vss; when enable is at −Vdd, the transistor 52 is on and the gate of transistor 53 is at Vss so the transistor 53 will not conduct.

The oscillator 35 includes a transistor 54 which receives the enable signal on line 34 and enables a path which has a depletion load 55, a driver transistor 56, and another series transistor 57. The gate of the transistor 56 is connected to a node 58 by line 59; line 59 in effect is an input to a Schmidt trigger circuit including the device 56. Node 60 is connected to the gate of device 61 to provide feedback via line 62. Also, node 60 is connected to the gate of inverter device 63 which has its output connected by line 64 to the gate of transistor 65 which shunts a capacitor 66 at the node 58. The Schmidt trigger along with the capacitor 66 and its depletion charging device 67 and shunt device 65 together function as a sawtooth generator which defines the oscillator frequency. The node 58 and line 59 will charge toward the threshold of the Schmidt trigger, at a rate defined by the value of capacitor 66 and device 67, and when the threshold is reached device 56 will turn on, turning off device 63 so line 64 goes negative and turns on device 65, thus discharging the capacitor 66. Then, the capacitor will begin to charge toward the threshold again. When transistor 56 goes on, device 61 goes off and line 62 goes negative, discharging node 68.

When the enable signal on line 34 is negative, a device 69 is on, and a negative voltage on line 64 turns on device 70, which connects node 71 and thus input line 59 to the Schmidt trigger to ground, resetting the circuit.

Another Schmidt trigger circuit including devices 72 to 77 functions like the first Schmidt trigger but has a different threshold, so it acts to produce the proper duty cycle, without changing the oscillator frequency. An output inverter 78 provides the square wave oscillator signal on line 36.

The latch circuit 32 consists of a bistable latch containing a pair of driver transistors 80 and 81 with depletion loads 82 and 83 and cross coupling connections 84 and 85. When one of the transistors 80 or 81 is on, the other must be off. The latch is switched to an ON condition by the ON switch 14 which connects K1 line to ground and turns off a transistor 86 and thus turns on a transistor 87 shunting the driver transistor 80, turning off transistor 81 and placing the circuit in a stable state where transistor 80 is conductive, line 84 is at Vss, output transistor 88 is off, and line 34 or the enable signal is at −Vdd. The latch is switched to an OFF condition by the OFF switch 15 which connects K2 line to ground and turns off a transistor 89 and thus turns on a transistor 90 shunting the driver transistor 81, causing transistor 80 to turn off and forcing the latch into a stable state where transistor 81 is conductive, line 84 is at −Vdd, output transistor 88 is on and line 34 is at Vss so the oscillator will not be operating and transistor 40 is off. The gates of both transistors 86 and 89 are held at near −Vdd by resistors 81 and 92 which are on the chip 20 rather than external; these transistors are thus held on in the absence of depressing either on or off push-buttons. The latch circuit 32 is essentially the only part which draws current in the OFF condition, and this is held to less than thirty microamps by selection of device sizes and use of low power depletion loads.

The calculator chip 20 is internally programmed to turn itself off after a period of about 30 minutes. This is done by including a register decrement routine in the scan routine; a register or part of the RAM has a large number entered when a display routine begins, then is decremented once each scan cycle. A scan cycle is completed in about three or four hundred machine cycles, or about one millisecond; thus the register would be decremented from a decimal number of about 2 million, easily within the capability of a 16 digit register. When the register reaches zero, the system is programmed to jump to an instruction which is decoded to provide an OFF command on a line 161 in FIG. 8. This command functions the same as closing the key 15.

It will be noted that other key-push signals will appear on the line K2 when other keys are pushed; these must not be confused with the OFF key. It is for this reason that the line 13 is connected to Vss rather than SA. The segment lines 27 are regulated as elsewere discussed, and will never reach a level more positive than about −3 volts; this level when applied to the gate of transistor 89 will be above V$t$ or threshold voltage and so it will not turn off transistor 89.

Figure 9:
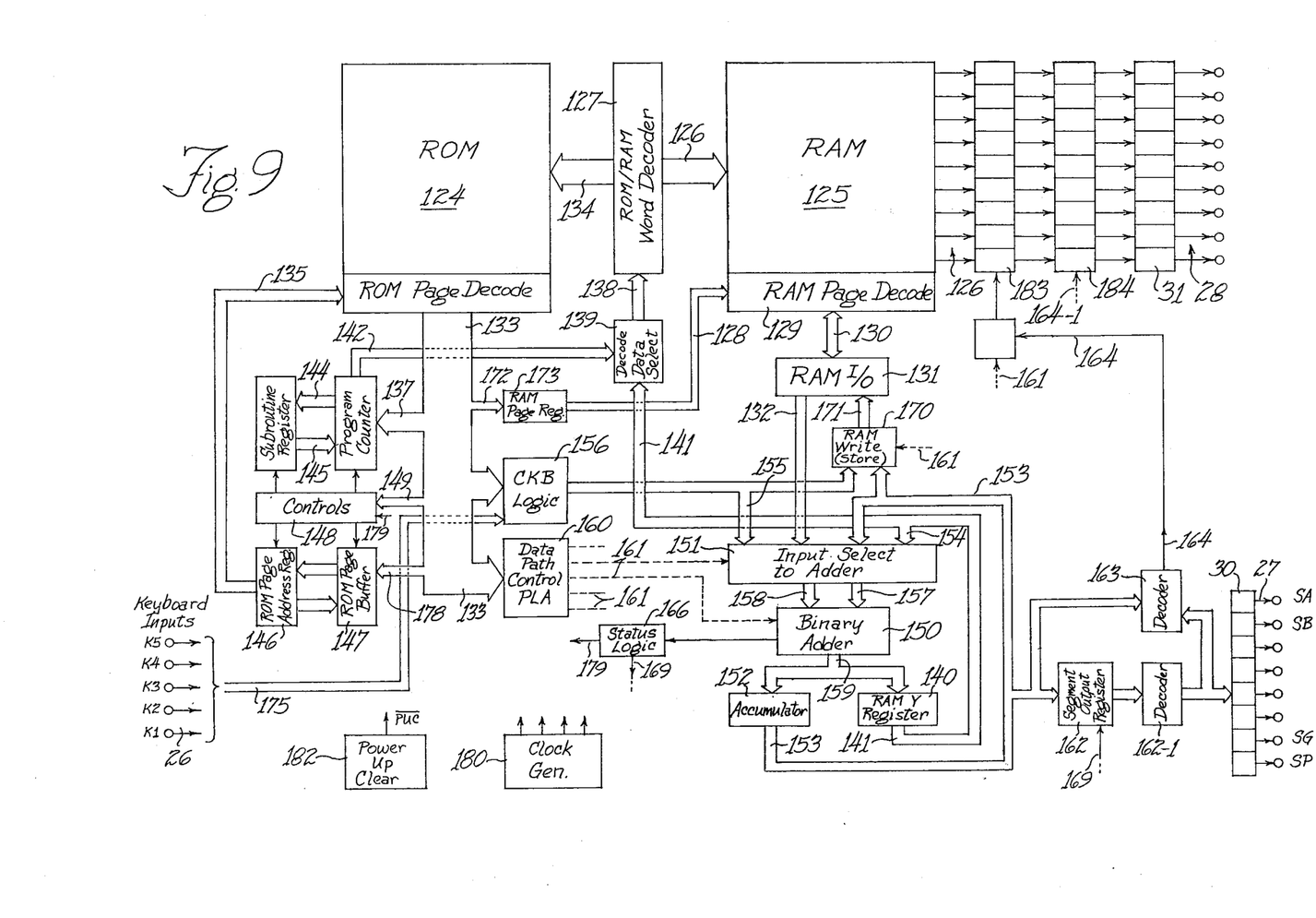
FIG. 9 is a detailed block diagram of one type of MOS/LSI calculator chip which may use the princples of the invention, inparticular the chip 20 of FIG. 3.

A block diagram of the system within the chip 20 is shown in FIG. 9. This system is basically the same as the digit processor chip described in U.S. Pat. Nos. 3,991,305 or 4,014,013. The system is centered around a ROM (read-only-memory) 124 and a RAM (random-access-memory) 125. The ROM 124 contains a large number, for example 1024 or 2048, instruction words of eight or nine bits per word, and is used to store the program which operates the system. The RAM 125 contains perhaps 256 up to 576 memory cells software organized as four to nine sixteen-digit groups with four bits per digit. The number of words in the ROM or cells in the RAM depends upon the desired complexity of the calculator functions. Numerical data entered by the keyboard is stored in the RAM 125, along with intermediate and final results of calculations, as well as status information or "flags," decimal point position and other working data. The RAM functions as the working registers of the calculator system, although it is not organized in a hardware sense as separate registers as would be true if shift registers or the like were used for this purpose. The RAM is addressed by a word address on lines 126, i.e., one out of 16 word lines in the RAM is selected, by means of a combined ROM and RAM word address decode circuit 127. One of four or nine "pages" of the RAM is selected by an address signal on lines 128 applied to a RAM page address decoder 129 in the RAM. For a given word address on lines 126 and page address on lines 128, four specific bits are accessed and read out on RAM I/O lines 130, via input/output circuit 131, to RAM read lines 132. Alternatively, data is written into the RAM 125 via the input/output circuitry 131 and the lines 130. Some of the sixteen lines 126 used as RAM word address are also used to generate the digit signals for display actuation on the lines 28; to this end the lines 126 pass through the RAM 125 and are connected to output registers and buffers as will be explained.

The ROM 124 produces an eight or nine bit instruction word on ROM output lines 133 during each instruction cycle. The instruction is selected from 8192 bit locations in the ROM, organized into 1024 words containing eight bits each, for a minimum function calculator, or fron 18432 bit locations organized into 2048 9-bit instruction words for a complex function calculator. The words are divided into, for example, 16 groups or pages of 64 words each (for the 8192 bit case). To address an instruction in the ROM requires a ROM word address on lines 135. The ROM word address on lines 134 may be generated in the same decoder 127 as used to generate the RAM word address on lines 126, or there may be separate decoders. The ROM word address is produced in a program counter 136 which is a multi-stage shift register that may be updated or incremented after an instruction cycle or may have an address loaded into it via lines 137 from ROM output lines 133 for a call or branch operation. The RAM and ROM word address decoder 127 receives an encoded address on lines 138 from decode data select unit 139 which has two inputs. The unit 139 may receive a four-bit address from RAM Y register 140 via lines 141, or it may receive a ROM word address from the program counter 136 via lines 142. A six-bit subroutine register 143 is associated with the program counter 136 to serve as temporary storage for the return word address during subroutine operations. A ROM word address is stored in the register 143, via lines 144 when a call instruction is initiated so that this same address may be loaded back into the program counter 136 via lines 145 when execution of the subroutine which begins at the call location has been completed; this conserves instruction words and makes programming more flexible. The ROM page address on lines 135 is generated in a page address register 146 which also has a buffer register 147 associated with it for subroutine purposes. The register 146 will always contain the current page address for the ROM, and directly accesses the ROM page decoder. The buffer register 147 is a multifunction buffer and temporary storage register, the contents of which can be the present ROM page address, an alternate ROM page address, or the return page address during subroutine operations. The program counter, subroutine register and ROM page addressing are all controlled by control circuitry 148 which receives inputs from the ROM output lines 133 via lines 149. The control circuitry 148 determines whether branch and call on "status" or subroutine operations are performed, causes loading of an instruction word into the program counter and/or page address register, controls transfer of bits to the subroutine or buffer registers and back, controls updating of the program counter, etc.

Numerical data and other information is operated upon in the system by a binary adder 150 which is a bit-parallel adder having a precharged carry circuit, operating in binary with software BCD correction. The input to the adder 150 is determined by an input selector 151 which receives four-bit parallel inputs from several sources and selects from these what inputs are applied to the adder. First, the memory read or recall lines 132 from the RAM 125 provide one of the alternatives. Two registers receive the adder output, these being the "RAM Y" register 140 and an accumulator 152, and each of these has output lines separately connected as inputs 153 and 154 of the selector 151. A fourth input 155 receives an output from "CKB" logic 156. Thus, the adder input is selected form the following sources: data memory or RAM 125 on lines 132; accumulator 152 via lines 153; RAM Y register 140 via lines 154; constant, keyboard or "bit" information from CKB logic 156 on lines 155. Positive and negative inputs to the adder 150 on lines 157 and 158 are produced from the selector circuitry 151.

The output from the adder 150 is applied to either or both the RAM Y register 140 and the accumulator 152 via lines 159. All of the operations of the adder 150 and its input selector 151, etc., are controlled by a data path control PLA 160 which is responsive to the instruction word on lines 133 from the ROM. Control outputs 161 from the control PLA 160 are indicated by dotted lines. The four-bit output from the accumulator 152 is unconditionally applied via lines 153 to a segment output arrangement which includes a three bit buffer register 162 and also includes a segment decoder 162-1 for output from the system. The register 162 defines which of the eight lines 27 are energized at a given time. It requires only three bits, so it uses only three of the four parallel outputs of the accumulator. A line 161 from the control PLA 160 applies a "load segment" command to the register 162 when programmed to do so, at which time the desired segment is loaded from the accumulator, and it will remain in the register 162 until zeros are loaded to clear the register. The decoder 162-1 is a standard decoder which accepts the three bit output of the register 162 and actuates one-of-eight of the lines 27, i.e., actuating one of the segment outputs SA to SP, via output buffer transistors 30. A decoder 163, similar to a programmable logic array, also receives the four-bit output 153 from the accumulator 152, as well as the output of the decoder 162-1. After the register 162 has been set up, the digits to be displayed are outputted, one at a time, from the accumulator, and the decoder 163 detects when the digit to be displayed contains a segment which should be actuated. When this is true, a "display digit" command is produced on a line 164, which is used to control a digit output as will be described.

A status logic circuit 166 provides the function of examining for carry or compare from the adder 150, and determining whether to branch or call. To this end, inputs from the adder 150 via lines 167, and input from the control PLA 160 via lines 161 are provided.

A control circuit 170 determines what and when data is written into or stored in the RAM 125 via input/output control 131 and lines 130. This RAM write control 70 receives inputs from either the accumulator 152 via lines 153 or the CKB logic 156 via lines 155, and this circuit produces an output on lines 171 which go to the RAM I/O circuit 131. Selection of what is written into the RAM is made by the instruction word on lines 133, via the data path control PLA 160 and command lines 161. Constants or keyboard information, from CKB logic 156, as well as the adder output via the accumulator, may be written into the RAM, via the write control 170, and further the CKB logic 156 can be used to control the setting and resetting of bits in the RAM, via the write control 170.

The RAM page address into which data is written is determined by certain bits of the instruction word on lines 133, as applied via lines 172 to a RAM page address register 173 and thus to lines 128 which select the RAM page. The RAM word or Y address is of course selected by the contents of RAM Y register 140, select circuit 139 and decoder 127.

The keyboard inputs 26 appear on lines 175, from which an input to the CKB logic 156 is provided. Five inputs are shown, although the same systems may need only three or four. In a four-bit case, a keyboard input goes via CKB logic 156 to the accumulator 152 or RAM Y register 140, from whence it is processed by software or ROM programming/

Also included within the chip 20 is a clock oscillator and generator 180 which generates internally a basic clock frequency of about 500 KHz or less, and from this produces a number of clock used throughout the system. A powerup-clear circuit 182 produces controls which clear the calculator after the power is turned on.

The outputs 28 from the chip 20, used for display digit selection, are generated from the RAM word address on lines 126 by first digit output register 183 which is loaded under control of a command on a line 161, a command on a line 164 from the decoder 163, and by RAM word lines 126. That is, the digit to be displayed is transferred from its place in the RAM 125 via adder 150 to accumulator 152 and to decoder 163; if this digit contains the segment then actuated at the output of decoder 162-1, the decoder 163 produces and output on line 164, which will allow a "set command" to pass through a gate 164-1 from a line 161, so that whatever appears on the lines 126 will be loaded into register 183. The lines 126 are actuated in sequence, corresponding to the positions being outputted via 153 to decoder 163. After all digits in the number to be displayed have been examined, the register 183 will be set with all the digits to be actuated for the current segment. For the example of FIG. 6, while SA is actuated, the stages D1 and D3 would be set to contain 1's and all other stages would be at 0 to display 345. The output from the first register 183 is connected to a second digit output register 184 which is loaded from the register 183 by a "load command" on a line 161 from the control PLA 160. The output of the register 184 is connected to a set of output buffer transistors 31.

Sixteen outputs are possible, but only nine would be needed in a simple calculator design; eight digits for mantissa and one for minus sign. Thus, nine stages would be provided in the register 183, so only the first nine of the 16 address line 126 would be used.

It is important that the register 183 is a random access register, where all bits are separately, independently, and mutually exclusively addressed. When one of the nine bits in the register 183 is addressed from decoder 127, either a "1" or "0" may be entered into register 183 under control of the "set command" on a line 161 from the control PLA, i.e., from the current instruction word, as determined by the output of the decoder 163 in the segment output arrangement. The bit will remain in the defined state until again specifically addressed and changed; meanwhile any or all of the other bits may be addressed and set or reset in any order. It is possible to have any combination of register 183 bits set or reset, providing $2^9$ or 512 code combinations on the output lines 18. Ordinarily, however, a routine is used whereby the nine stages of the register 183 are addressed in decending order, MSD to LSD, repetitively, to provide a scan cycle. After a scan cycle, or during power up or hardware clear, all the bits of the register 183 are unconditionally set to "0" except the LSD which may show a zero to indicate that power is on.

Similar to the register 183, the other output register 162 is static in that the contents once entered will remain until intentionally altered. The output register 162 functions as an output buffer, remaining set while the accumulator 152 is being manipulated to form the next output or to output the digits to the decoder 163. The output register 183 is a similar buffer for outputing the contents of the Y register 140, but has the additional feature of being fully random access. The data sources for the Y register 140 are the following: a four-bit constant stored in the ROM 124 as part of an instruction word; the accumulator 152 transferred to the Y register 140 via the selector 151 and adder 150; and data directly from the RAM 125. Once data is in the Y register 140 it can be manipulated by additional instructions such as increment or decrement.

Referring again to FIG. 5, it is noted that the segment output buffer transistors 30 are eight p-channel MOS transistors, each of which has its source-drain path connected between Vss and one of the lines 27. The cathode 29 of each digit is connected via a line 28 to one of the nine digit output buffer transistor 31, each of which is a p-channel MOS transistors which has its source-drain path connected between a cathodes 29 and the −Vdd voltage supply. At any given instant a digit output buffer transistor 31 can be conducting the current of only one segment. The current of one segment can be sinked to −Vdd, whereas the current of eight segments cannot, without undue size requirements for the output buffers, which is the reason for scanning segments rather than digits. The signals on the gates of transistors 30 are $\overline{SA}$ to $\overline{SP}$ as appear at the output of the decoder 162-1, while the signals on the gates of transistors 31 are $\overline{D1}$ to $\overline{D9}$ as appear at the output of register 84. The voltages on the gates of transistors 30 can be regulated, or other means can be provided, to assure that the segments will glow with a constant brightness regardless of the number of segments on at a given time.

It will be noted that the time period of one of the segment scan signals $\overline{SA}$ to $\overline{SP}$ is many times that of a machine cycle, i.e., a cycle during which one instruction word appearing on lines 133 is completely executed. Perhaps forty or more machine cycles occur during each of $\overline{SA}$, $\overline{SB}$, etc. Thus, the output buffer registers 162 and 184, being static or latched, permit the machine to perform various functions during the time that a given segment remains actuated. For example, the digit code of FIG. 6 for the $\overline{SB}$ period is set up in the registers 183 and 184 during the time $\overline{SA}$ is actuated. Also, a keyboard test or input routine may be implemented during each of the signals $\overline{SA}$ to $\overline{SP}$.

All of the circuitry shown in FIG. 9 is not powered, i.e., has no V'dd applied to it, when the calculator is in the OFF condition. When V'dd comes on as the transistor 40 is turned ON, the power up clear circuit only then begins to function to generate a $\overline{PUC}$ voltage which is used to zero all registers and set the calculator in a condition to receive the first keyboard entries. Of course, the clock oscillator 180 is not powered up until V'dd appears on line 42.

Figure 10:
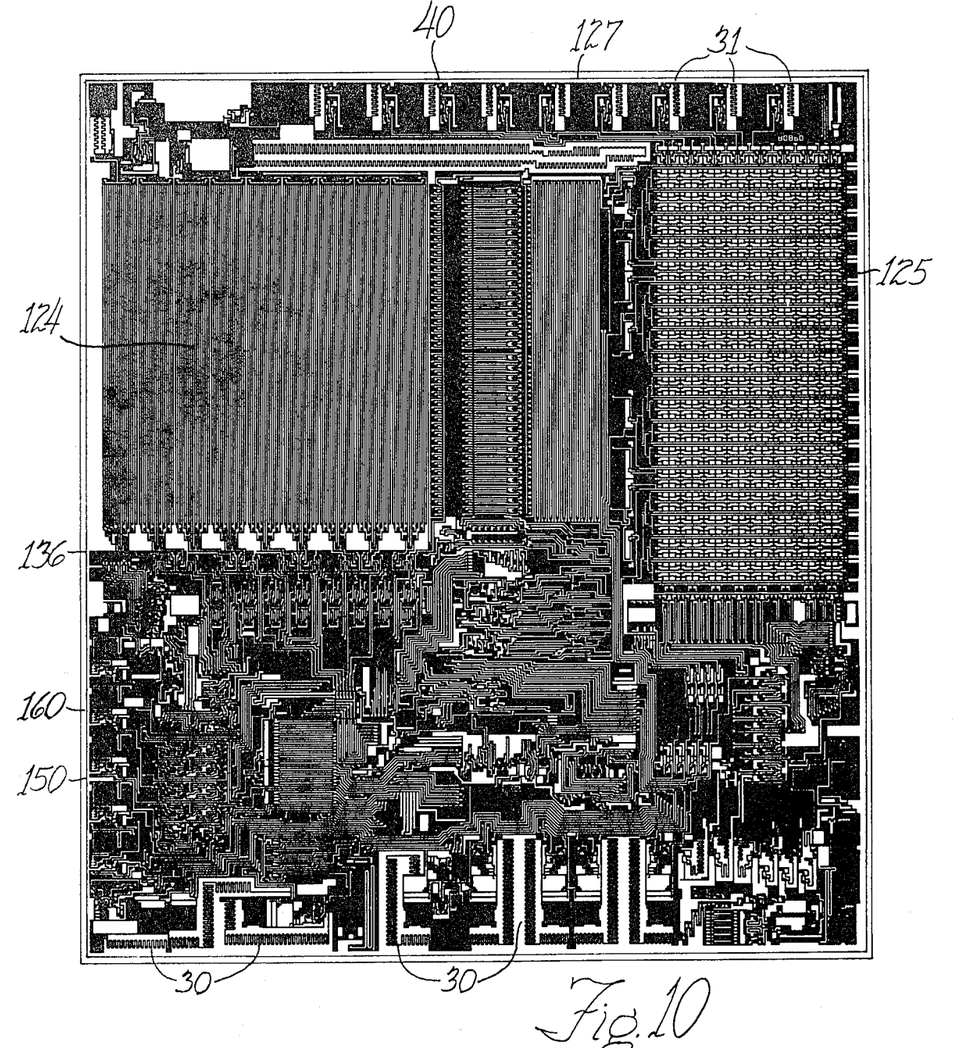
FIG. 10 is a plan view of the calculator chip 20, showing the metal mask or metal pattern, enlarged about 50X.

In FIG. 10, a calculator chip 20 is illustrated by a greatly enlarged plan view of a metal level mask. The most notable feature of the chip is the very large transistor 40 which has a length about half of the width of the chip. The chip size is perhaps 170 mils on a side. The ROM 124 occupies a large part of the chip, as does the RAM 125, and the ROM word decoder 127. The data control PLA 160 may be identified, and the adder 150, as well as large segment output buffer transistors 30 and smaller digit output buffer transistors 31.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is, therefore, contemplated that the appended claims will cover any such modifications or embodiments as fall within the true scope of the invention.

What is claimed:

1. Power switch apparatus for a batteryoperated electronic calculator device having a plurality of pushbutton momentary contact keyswitches, a large-scale-integrated MOS semiconductor device coupled to the keyswitches by a plurality of conductors, electronic circuitry within the device for processing information entered by the keyswitches, a segmented multiple digit display, means for scanning inputs of the display with scan signals, the keyswitches being in a matrix of rows and columns, the columns of the keyswitches being actuated by said scan signals, comprising: a bistable latch circuit continuously powered by the battery, a semiconductor control element in the form of an MOS transistor responsive to the condition of the latch circuit and exhibiting a low impedance when the latch is in one condition and exhibiting a high impedance when the latch is in the other condition, coupling means connecting a first of the keyswitches to the latch circuitry to cause the latch circuit to switch to said one condition upon actuation of the push-button keyswitch, means connecting said electronic circuitry to the battery only through the semiconductor control element, coupling means connecting a second of the keyswitches to the latch circuit to cause the latch circuit to switch to the other stable state upon actuation of the associated push-button, said first and second keyswitches being on the same column, the column upon which the first and second keyswitches appears being actuated continuously by a fixed potential which is different from the potential of the scan signals.

2. Apparatus according to claim 1 wherein the latch circuit includes means to discriminate between said fixed potential and the scan signals.

3. Apparatus according to claim 2 wherein the segments of the multiple digit display are scanned by the scan signals.

* * * * *